(12) United States Patent
Williams

(10) Patent No.: US 7,997,623 B2
(45) Date of Patent: Aug. 16, 2011

(54) FRAC TANK STORAGE SYSTEM

(76) Inventor: Chris Williams, Morrison, IL (US)

( * ) Notice: Subject to any disclaimer, the term of this patent is extended or adjusted under 35 U.S.C. 154(b) by 0 days.

(21) Appl. No.: 12/983,719

(22) Filed: Jan. 3, 2011

(65) Prior Publication Data

US 2011/0109073 A1    May 12, 2011

Related U.S. Application Data

(63) Continuation of application No. PCT/US2009/050436, filed on Jul. 13, 2009.

(60) Provisional application No. 61/080,259, filed on Jul. 13, 2008.

(51) Int. Cl.
*B60P 3/22* (2006.01)
(52) U.S. Cl. ........................................ 280/836; 280/837
(58) Field of Classification Search .......... 280/836–838; 220/15
See application file for complete search history.

(56) References Cited

U.S. PATENT DOCUMENTS

| 5,072,845 | A | * | 12/1991 | Grogan | 220/1.5 |
| 5,816,423 | A | | 10/1998 | Fenton et al. | |
| 6,199,910 | B1 | * | 3/2001 | Wade | 280/837 |
| 6,375,222 | B1 | * | 4/2002 | Wade | 280/837 |
| 2010/0032435 | A1 | * | 2/2010 | Satterfield et al. | 220/562 |
| 2011/0006068 | A1 | * | 1/2011 | Kaupp | 220/562 |

FOREIGN PATENT DOCUMENTS

| EP | 0 369 358 A1 | 5/1990 |
| EP | 0 601 774 A2 | 6/1994 |
| WO | WO 2004/085289 A1 | 10/2004 |

* cited by examiner

*Primary Examiner* — Kevin Hurley
*Assistant Examiner* — Tashiana Adams
(74) *Attorney, Agent, or Firm* — Leydig, Voit & Mayer, Ltd.

(57) ABSTRACT

A frac tank, configured for containerized handling, stacking and shipping in container cargo stacks, includes rear over-the-road axle and wheel support, a rear adapter for selectively exposing the rear wheels to enable mobile transport with a fifth-wheel equipped vehicle, and a front adapter for selectively exposing elements at the front of the tank during on-site use of the tank.

17 Claims, 9 Drawing Sheets

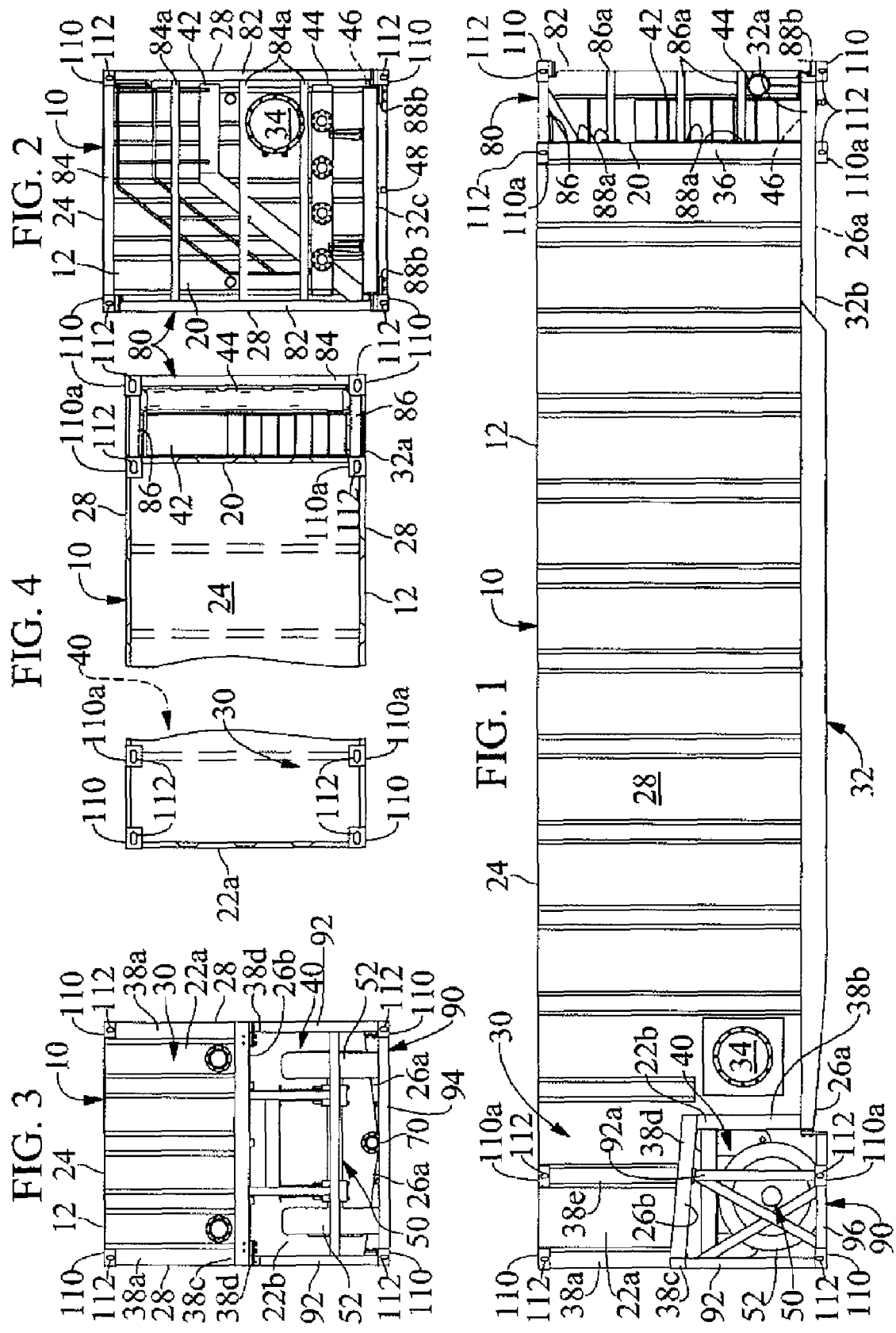

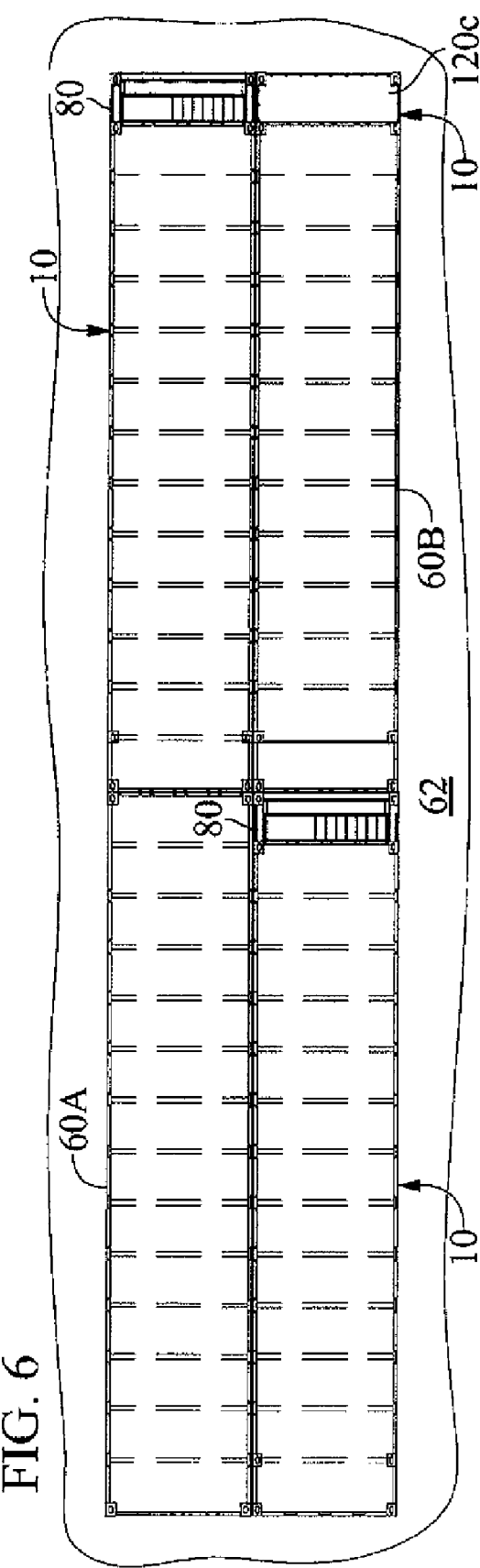
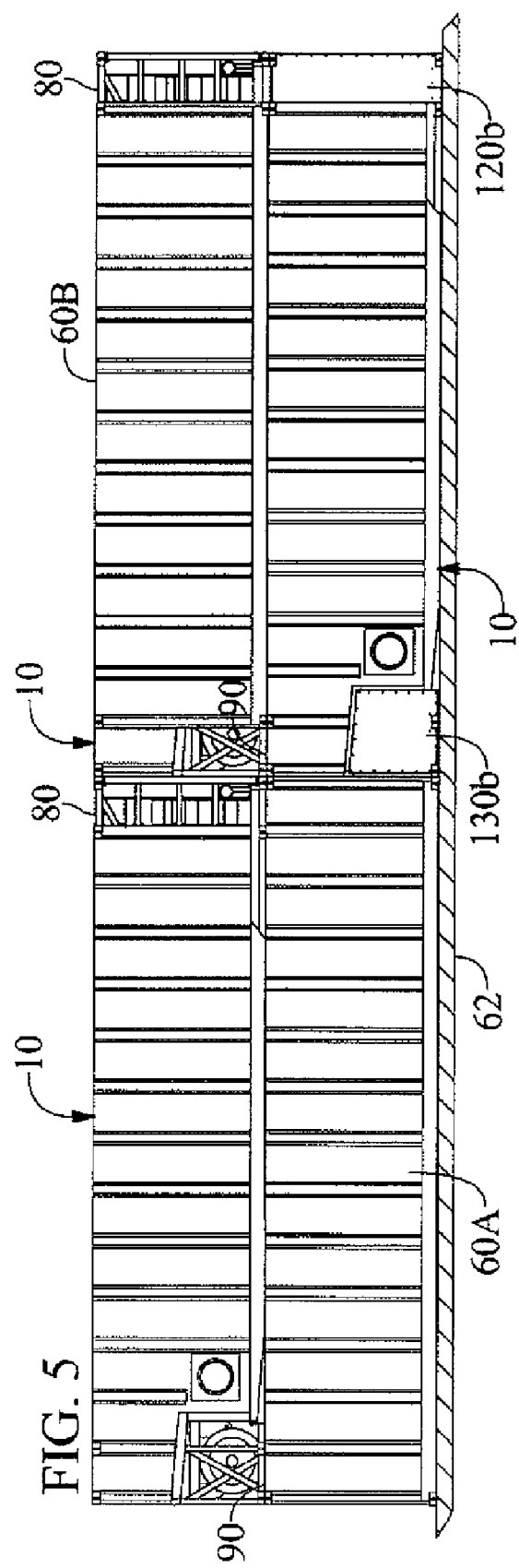

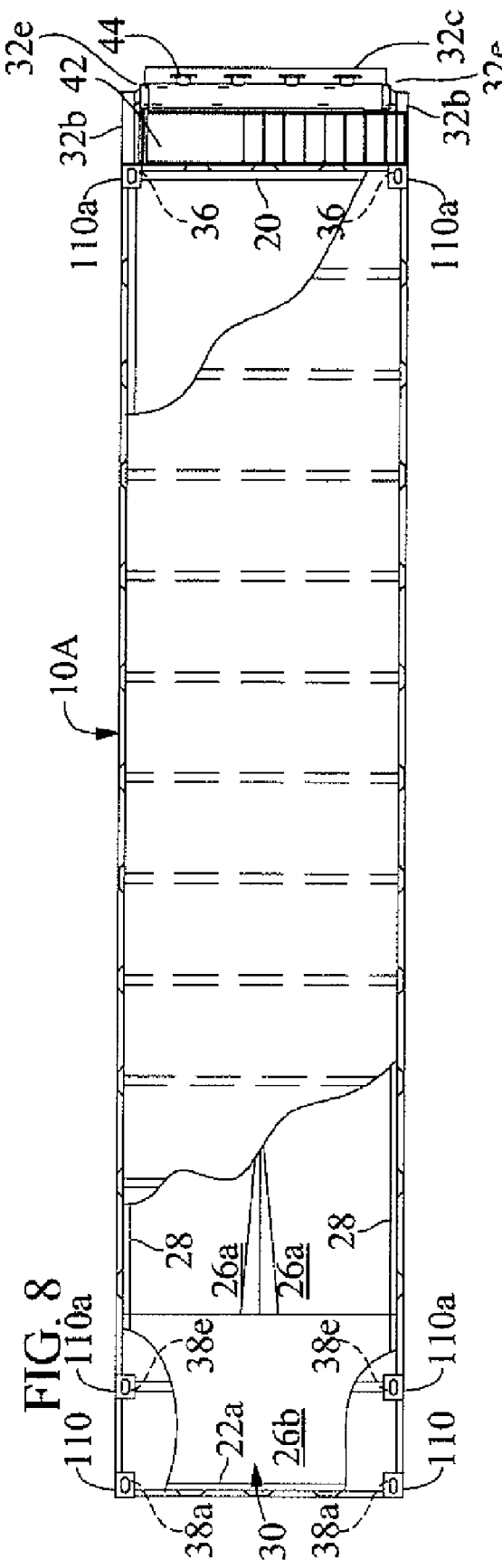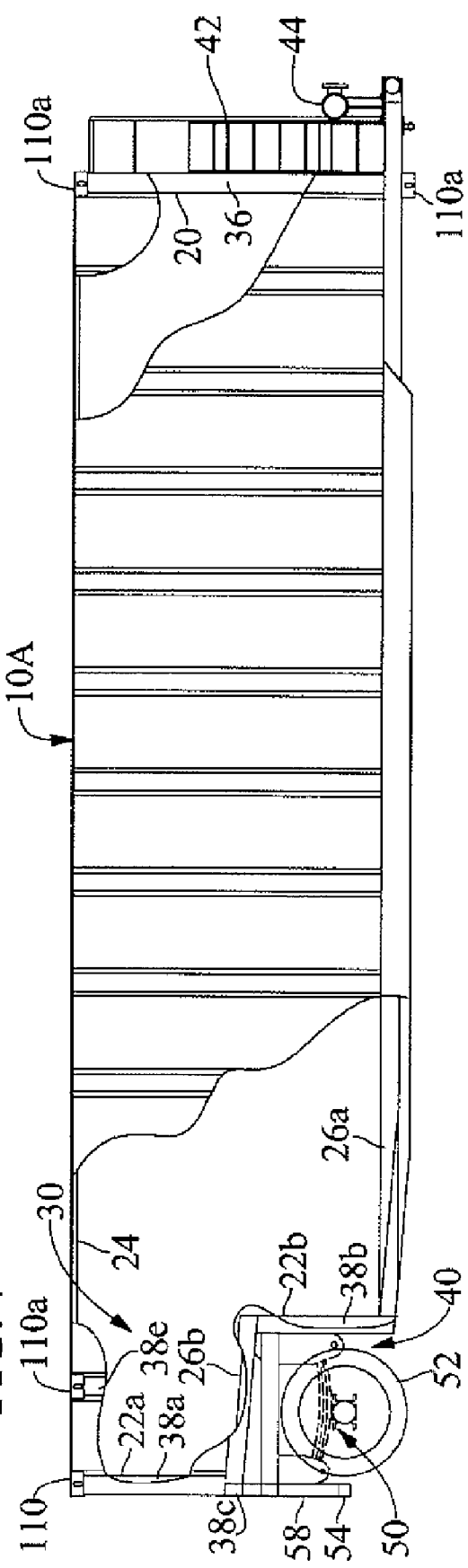

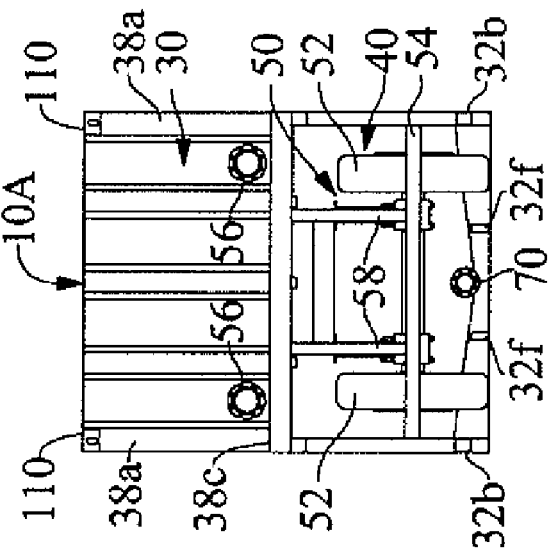
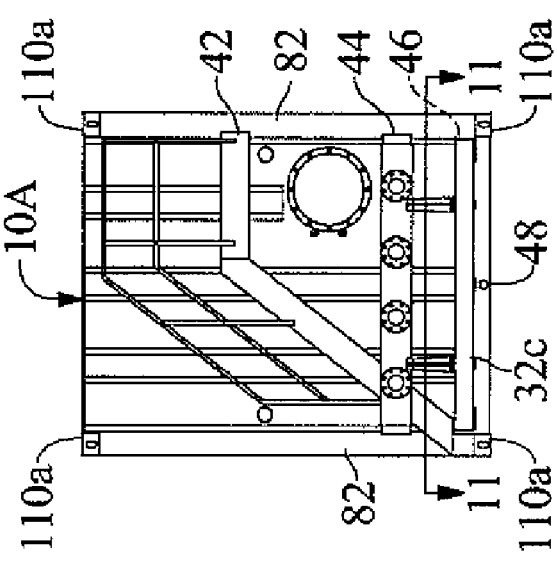
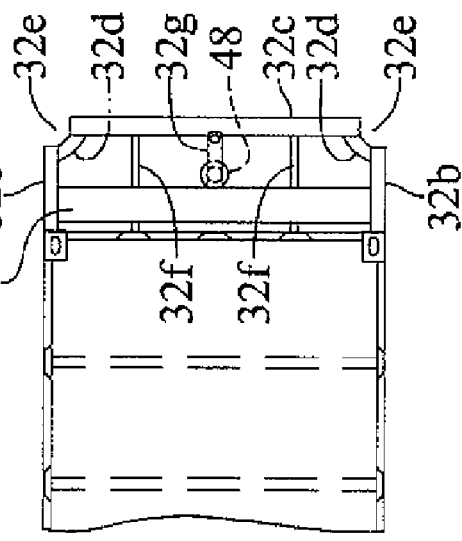

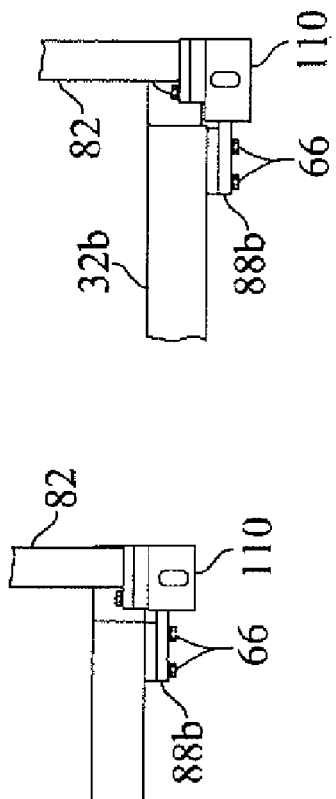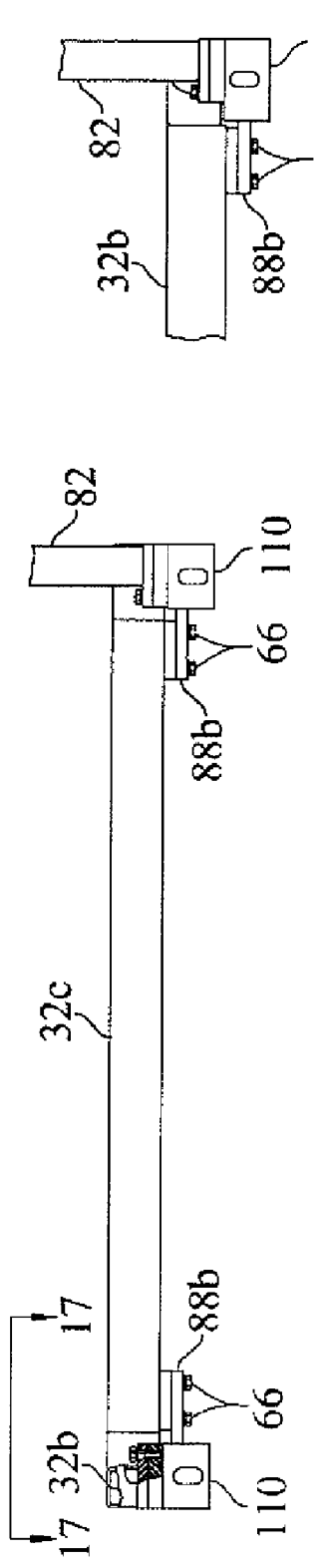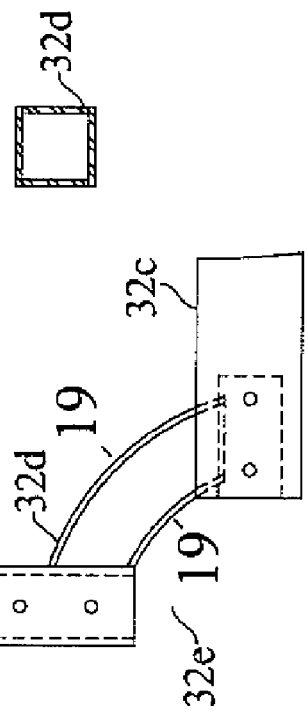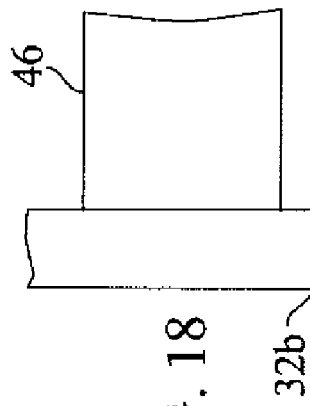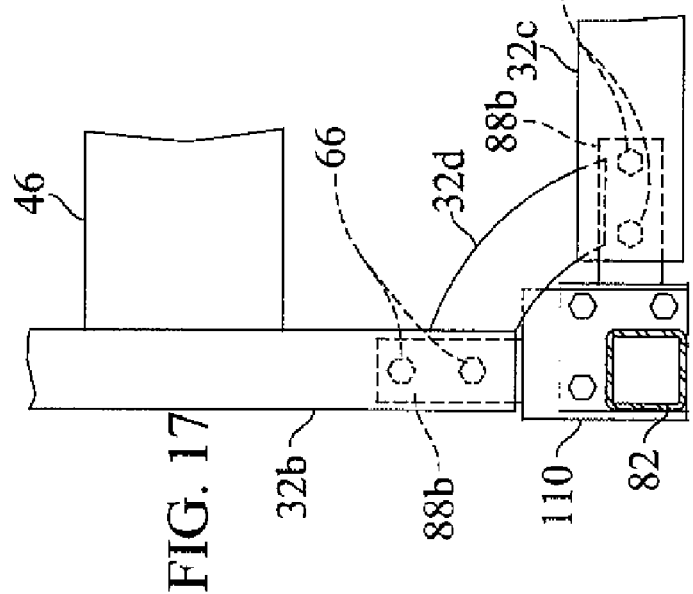

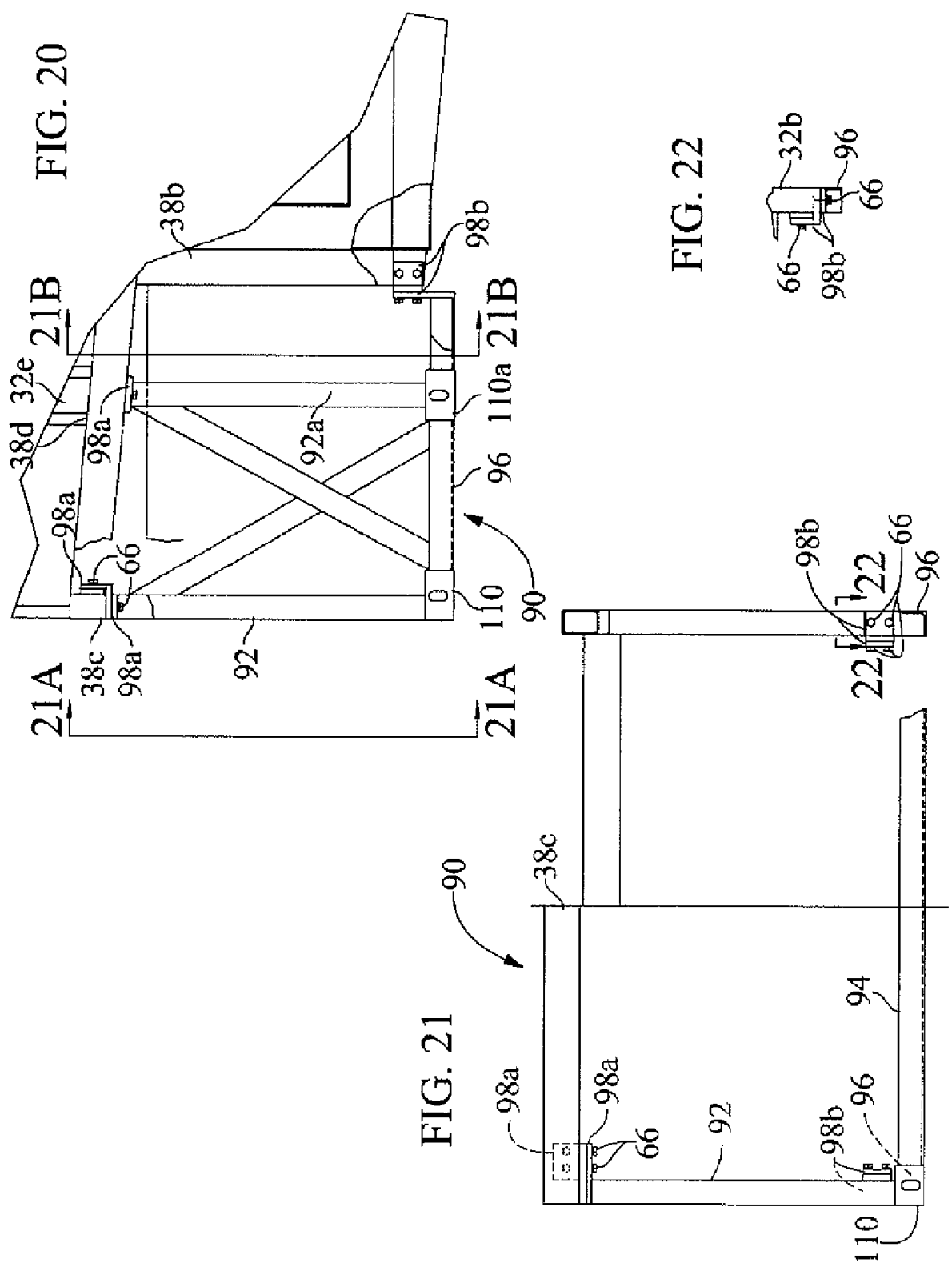

FRAC TANK STORAGE SYSTEM

RELATED APPLICATIONS

This application is a continuation of application PCT/US2009/050436 with an international filing date of Jul. 13, 2009 and which in turn claims priority to U.S. Provisional Application No. 61/080,259 filed Jul. 13, 2008. The entire specification and drawings of the aforementioned applications are incorporated by reference herein as if fully set forth.

BACKGROUND OF THE INVENTION

1. Field of Invention

This invention relates generally to a storage tank.

More particularly, the invention relates to a storage tank, commonly known as a frac tank, to hold fluid for use in oil well drilling operations, and to a transportation and storage system including a frac tank.

2. Background Art

Frac tanks are used to hold fluid, sometimes referred to as drilling fluid or fracturing fluid, or a liquid constituent or mixture therefor, for pumping into an oil well during drilling operations.

Some conventional frac tanks are configured to be pulled with a semi-tractor or transported on a flat-bed semi-trailer. However, transport by such means is not always the most economical method of transport. Where overseas shipping is involved, such conventional frac tanks need to be located in the "bulk area" of the ship, which is significantly more expensive per floor space than in the container stacks on the ship.

Multiple frac tanks are sometimes stored near a well site. This can require significant ground space.

There is a need for a frac-tank that addresses the above-identified and other drawbacks and disadvantages of conventional frac tanks Among other things, there is a need for a frac tank that can be shipped by the most economical means available, and that can be stacked to reduce ground space required for storing multiple frac tanks.

SUMMARY OF THE INVENTION

The general objective of the invention is to provide a new transportation and storage system with a uniquely configured frac tank for holding and supplying fluid to an oil well drilling site.

In general, the invention provides a frac tank system configured for alternate (i) placement, stacking and shipping with other frac tank systems, as well as with conventional shipping containers, in the container cargo stacks on, for example, the deck of a barge or a ship, and (ii) mobile transport with, for example, a semi-tractor.

In one aspect of the invention, a frac tank system is provided in a containerized condition for handling and shipping as a conventional container, but is also provided with wheels that can be exposed for pulling with a fifth-wheel equipped vehicle.

In another aspect of the invention, a frac tank system includes mobile frac tank configured for pulling with a fifth-wheel equipped vehicle, and adapters for converting the mobile frac tank into a containerized frac tank.

The size, strength, interface details, and other aspects of conventional shipping containers, also known as intermodal containers, freight containers and ISO containers, are generally controlled by ISO (www.iso.org) standards, such as ISO 668 (Series 1 freight containers; Classification, dimensions and ratings); ISO 830 (Freight containers; Vocabulary); ISO 1161 (Corner fittings; Specification); and ISO 1496 (Series 1 freight containers; Specification and testing), all of which are incorporated herein by reference. In the preferred embodiments of the invention, the frac tank system in the containerized condition complies sufficiently with these standards for handling, stacking, and shipping as if they were conventional containers.

Briefly, one preferred frac tank system, according to the invention, includes a frac tank with front and rear frac-tank elements (e.g., valves, valve connections, hose connections, access ports), a front fifth-wheel king pin, rear over-the-road axle and wheel support for highway speed travel, and removable front and rear adapter structures. The adapter structures surround and protect the front and back frac tank components that may be otherwise exposed during transportation and storage. More importantly, in accordance with the invention, the adapter structures convert the frac tank between a mobile condition with the wheels and king pin exposed to be pulled by a fifth-wheel equipped vehicle, and a containerized condition with an overall conventional shipping container configuration, including outer dimensional size, pickup and support locations, and structural supporting strength, to achieve handling, stacking and shipping interchangeability with conventional shipping containers. The adapter structures are secured to the ends of the mobile frac tank, to adapt the tank for shipping as a standard freight container. The adapter structures are removed from the tank to haul it down the road by a semi-tractor hooked to the fifth wheel, to pull the tank down the road on its wheels. The adapter structures unbolt from the ends of the tank and can be reattached at a later time if the tank is to be again shipped as standard freight. The preferred adapter structures each comprise a framework that can be bolted or otherwise removably secured to the ends of a frac tank to achieve the containerized configuration, and thin covers that may be secured to the framework for additional protection to the operational or front and rear elements of the frac tank.

By virtue of its flexible shipping options, the frac tank system can significantly reduce freight expense by enabling use of the most cost effective method of transport for a particular job (e.g., via tractor trailer, flatbed, rail), and the system can be shipped at a reasonable cost to destinations that would otherwise be cost prohibitive for shipping of conventional frac tanks due to their required placement in the bulk area of the ship.

By virtue of the expanded shipping options, the frac tank system will have an increased potential service area as compared with conventional frac tanks, and more frac tanks can be delivered to distant sites sooner and more economically than conventional frac tanks By virtue of its containerized configuration, the frac tank system can significantly reduce freight cost on international shipping due to placement in the regular stacks rather than the more expensive bulk area.

By virtue of its containerized configuration, the frac tank system permits stacking of tanks during downtime to reduce required storage area and costs as compared with storage of conventional frac tanks By virtue of its containerized configuration, including corner crane pockets, the frac tank system allows for expanded job site options and ease of on-site placement as compared with the conventional mobile frac tank. As a result, the frac tank system reduces operational footprint in ever smaller and environmentally sensitive sites.

Although it is anticipated that the frac tank, according to the invention, will typically be used in connection with oil field fracturing operations, the tank may be used for other purposes, such for environmental cleanup work, for holding water or cleanup fluids from spills, and any use involving temporary storage of fluids.

A frac-tank system, in accordance with the invention, achieves these and other objectives and advantages of the invention which will become more apparent from the following detailed description when taken in conjunction with the accompanying drawings.

BRIEF DESCRIPTION OF THE DRAWINGS

FIG. 1 is a side view of a frac tank system according to the invention, the frac tank system being in its containerized condition.

FIG. 2 is a front view of the frac tank system shown in FIG. 1.

FIG. 3 is a back view of the frac tank system shown in FIG. 1.

FIG. 4 is a fragmentary top view of the frac tank system shown in FIG. 1.

FIG. 5 is a side view showing frac tank systems and conventional shipping containers stacked together in the container cargo area of a ship.

FIG. 6 is a top view showing frac tank systems and conventional shipping containers stacked together in the container cargo area of a ship.

FIG. 7 is a side view of the frac tank in its mobile condition, with segments of the side of the frac tank removed for viewing inside the tank, and with both the front and rear adapter frames removed from the tank.

FIG. 8 is a top view of the mobile frac tank shown in FIG. 7, with segments of the top of the frac tank removed for viewing inside the tank.

FIG. 9 is a front view of the mobile frac tank shown in FIG. 7.

FIG. 10 is a back view of the mobile frac tank shown in FIG. 7.

FIG. 11 is a fragmentary top view of the mobile frac tank shown in FIG. 7, but with the stairs and certain additional components not being shown.

FIG. 15 is an enlarged fragmentary front view of certain additional parts of the front frame as shown in FIG. 2.

FIG. 16 is a further enlarged fragmentary side view of certain additional parts of the front frame as shown in FIG. 1.

FIG. 17 is an enlarged fragmentary view of a lower corner of the frac tank system taken substantially along the line 17-17 of FIG. 15, with the front frame in position at the front of the frac tank.

FIG. 18 is a view similar to FIG. 17 but with the front frame removed from the frac tank.

FIG. 19 is a cross-sectional view taken substantially along the line 19-19 of FIG. 18.

FIG. 20 is an enlarged fragmentary side view of the back frame as shown in FIG. 1, with certain frame members being broken away for viewing certain additional parts.

FIG. 21 is an enlarged view of the back frame, with the left half of FIG. 21 being a fragmentary view taken substantially along the line 21A-21A of FIG. 20, and the right half of FIG. 21 being a fragmentary cross-sectional view taken substantially along the line 21B-21B of FIG. 20.

FIG. 22 is a fragmentary cross-sectional view taken substantially along the line 22-22 of FIG. 21.

The following reference numerals are used in the drawings for the corresponding elements and aspects of the invention:

Figure 14:
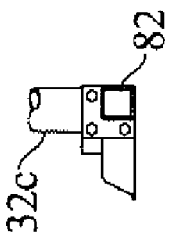
FIG. 14 is a fragmentary cross-sectional view taken substantially along the line 14-14 of FIG. 12.
Figure 13:
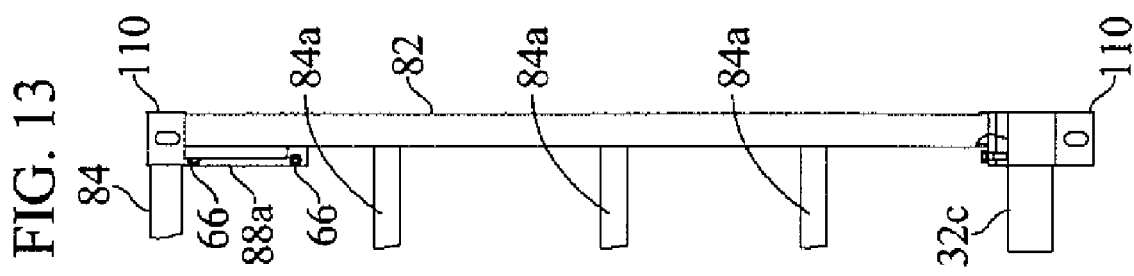
FIG. 13 is an enlarged fragmentary front view of certain parts of the front frame as shown in FIG. 2.
Figure 12:
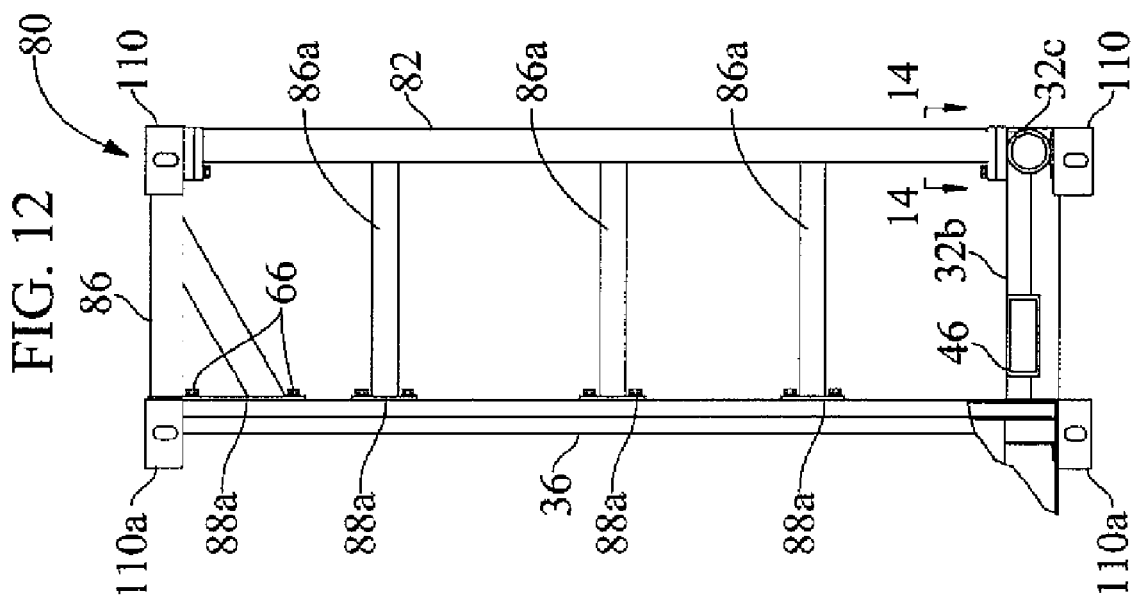
FIG. 12 is an enlarged fragmentary side view of certain parts of the front frame as shown in FIG. 1.

| | | | |
|---|---|---|---|
| 10 | frac tank system—containerized condition | 26b | bottom of upper tank section (raised segment of bottom of tank) |
| 10A | frac tank system—mobile condition | 28 | side walls of tank |
| 12 | frac tank | 30 | upper tank section |
| 20 | front wall of tank | 40 | open space below upper tank section |
| 22a | upper rear wall of tank (rear wall of upper tank section) | 34 | man-way covers |
| | | 32 | lower frame |
| 22b | lower rear wall of tank | 32a | front portion of the lower frame |
| 24 | top of tank | 32b | side frame members |
| 26a | bottom of main tank | 32c | front frame cross-member |
| 32d | front corner frame members | 60B | conventional shipping container, e.g., 40-foot length container |
| 32e | open-space at front frame corners | | |
| 32f | front-to-back frame members | 62 | ship deck |
| 32g | frame member support for king pin | 64 | semi-tractor |
| 36 | upright frame members at front of tank | 64a | fifth wheel coupling |
| 38a | upright frame members at back of upper tank section | 66 | bolts |
| | | 66b | threaded fasteners |
| 38b | upright frame members at back of main tank | 70 | rear drain valve location |
| | | 80 | front adapter frame |
| 38c | cross beams | 82 | front uprights |
| 38d | side beams | 84 | front support cross-beam |
| 38e | upright frame members at sides of upper tank section | 84a | additional front support cross-beam |
| | | 86 | side supports |
| | | 86a | additional side supports |
| 42 | stairs | 88a | upper flanges |
| 44 | outlet valve manifold | 88b | lower flanges |
| 46 | walkway | 90 | rear adapter frame |
| 48 | 5th wheel king pin | 92 | rear uprights |
| 50 | rear suspension system | 92a | additional rear uprights |
| 52 | rear wheels | | |

| | | | |
|---|---|---|---|
| 54 | horizontal step bar | 94 | rear support cross-beam |
| 56 | fill-valve locations | 94a | additional rear support cross-beams |
| 58 | vertical bars | 96 | rear side supports |
| 60A | conventional shipping container, e.g., 45-foot length container | 98a | upper flanges |
| | | 98b | lower flanges |
| 110 | corner fittings | 120a-c | front adapter cover panels |
| 110a | crane pockets | 130a-b | rear adapter cover panels |
| 112 | openings in corner fittings and crane pockets | | |

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

Figure 26:
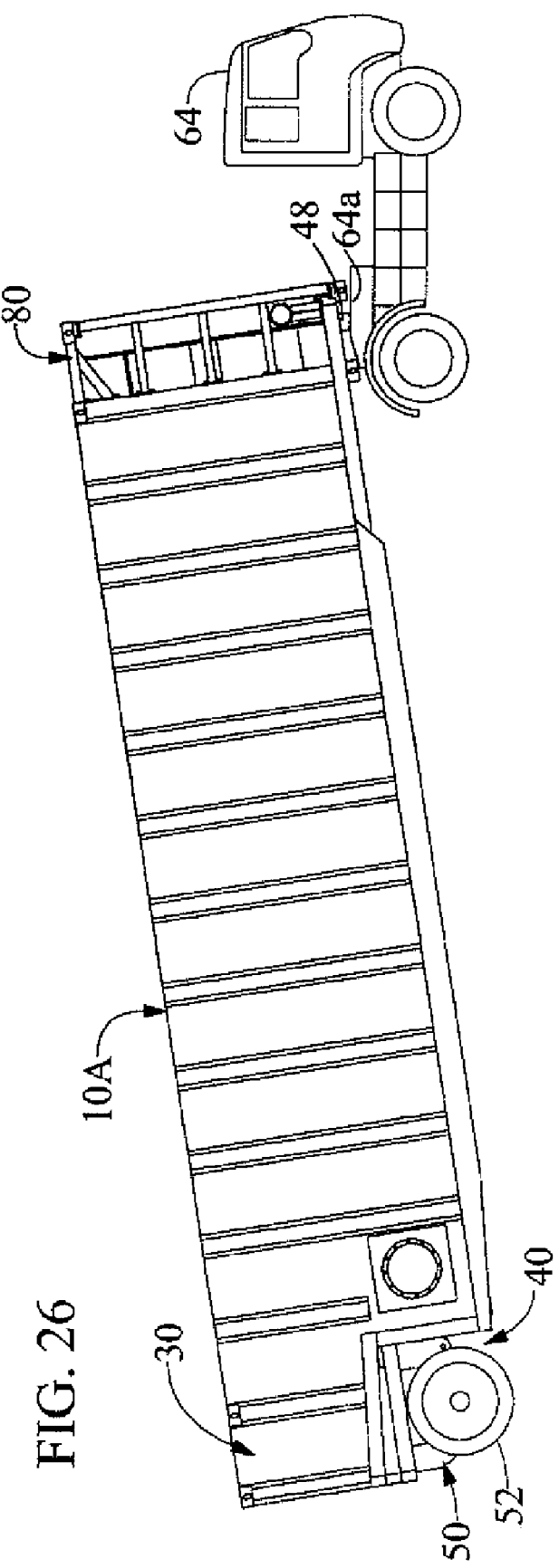
FIG. 26 is side view showing the frac tank system in its mobile condition, being transported with a semi-tractor, with the front adapter frame in place on the mobile frac tank.

The present invention is shown in the drawings as embodied in frac tank system 10 (FIGS. 1-4) for holding fluid at an oil well site, to be pumped into the oil well during drilling operations. In accordance with the invention, the frac tank system 10 is configured for alternate (i) placement, stacking and shipping with other frac tank systems, as well as with conventional containers 60A and 60B such as in the container cargo stacks on, for example, the deck 62 of a barge or a ship as shown in FIGS. 5-6, and (ii) mobile transport with, for example, a semi-tractor 64 such as shown in FIG. 26. More particularly, the frac tank system 10 is configured for conversion between a containerized condition as shown in FIGS. 1-6, and a mobile condition such as indicated by reference numeral 10A in FIGS. 26 and 7-10.

The preferred frac tank system 10 conforms to international shipping container standards, such as the generally accepted ISO standards for freight containers, sufficient structurally and dimensionally outwardly so as to be stackable and location interchangeable with conventional shipping container per said standards using shipping container handling equipment. This enables handling, stacking, storage and international shipping of the frac tank system as if it were a conventional shipping container. Thus, the frac tank system has a three-dimensional rectangular outer profile structure. One preferred size frac tank system is, thus, nominally 8 feet wide, 9 feet 6 inches high, and 20, 40 or 45 feet long. These sizes correspond to the common size shipping containers per said ISO standards, and thus together with other aspects discussed herein, provides for ease of transport and delivery to a job site virtually anywhere in the world, as well as convenient stacking and storage of both filled and empty tanks The frac tank system 10 includes a tank 12 to hold the fluid to be supplied to the oil well drilling site. The preferred tank is generally rectangular in its cross-section and outer profile in three dimensions to substantially fill the three-dimensional rectangular space defined by the ISO standard for the shipping container size to which the frac tank system conforms. In the embodiment shown, the tank is defined within a front wall 20, upper and lower rear walls 22a g and 22b, a top 24, lower and upper bottoms or floors 26a and 26b, and side walls 28. The front, top and side walls are generally planar and orthogonal with one another. The upper back wall 22a is parallel with the front wall. The back of the tank is established with an upper tank section 30 and an open space 40 directly below and within the footprint of the upper tank section when viewed from above and behind. The upper tank section 30 and open space 40 are separated by the raised bottom segment 26b. The open space 40 is bounded at its top by the raised bottom segment 26b and at its front by the lower rear wall 22b of the tank. The main, lower tank bottom 26a is at approximately zero grade lengthwise from front to back (as when viewed from the side as in FIG. 1), but slopes down from the outer sides toward its longitudinal center as can be seen in FIG. 3. This slight grade in the main tank bottom permits essentially complete withdrawal of fluid from the tank either during delivery of fluid to the drilling site or if draining the tank of unused fluid as from drain 26c. The tank is generally closed to contain the fluid, but is provided with internal access as desired, such as man-way locations with removable covers 34 for personnel access to the inside of the tank.

The tank 12 is supported on a substantially rectangular lower frame 32 that includes beams and other frame members welded or otherwise secured together, extending along the front, back and sides of the tank. A front portion 32a of the lower frame 32 extends forwardly from the front corners of the tank. The front portion of the frame 32 is established with the front ends of the side frame members 32b and a front cross-member 32c connected therebetween. The side members 32b and front cross-member 32c are connected with corner members 32d curved or otherwise configured so that the front corners 32e of the lower frame remain open. The front of the tank is supported in the corners by upright frame members 36 welded or otherwise secured to the forward part of the side supports 32b. Front horizontal cross-beams (not shown) may be welded between the upper ends of the uprights 36, and the lower ends of the uprights 36 or the side supports 32b along the lower front corner of the tank. The lower frame 32 may include additional cross-beams spaced along the length of the tank, and lengthwise or front-to-back laterally spaced beams 32f, in supporting relation under the tank and connected between the side supports 32b, the front cross-beam 32c, and a rear cross-beam at the back of the tank bottom. The back of the tank 30 is supported in the corners by upright frame members 38a, and additional frame members along the side corners of the tank around the lower open space 40. In the embodiment shown, upright beams 38b are welded to the back ends of side beams 32b, a horizontal cross beams 38c is welded between the bottoms of uprights 38a, and side beams 38d are welded along the bottom sides of the upper tank section 30 between the ends of the cross-beam 38c and the upper ends of uprights 38b.

Stairs 42 and an outlet valve manifold 44 are supported on the front portion 32a of the lower frame 32. The stairs may be secured to the front of the tank 12, with the top of the stairs secured to a front upright 36. The stairs provide access to the top of the tank. The outlet manifold receives liquid from the tank via an outlet pipe (not shown) that opens in the tank at the forward end near the longitudinal center of the tank bottom (i.e., the lowest point in the tank bottom where the sides 26a of the bottom meet). The valve manifold is configured for connection of valves, piping, hoses, etc., to accomplish delivery of liquid from the tank to the drilling site. A walkway 46 is connected between the sides members 32b at the front portion 32a of the lower frame 32 (see FIG. 11). A fifth wheel king pin 48 is also located at the front of the tank 12. The king pin is configured for securing the frac tank to a semi-tractor 64 via the fifth wheel coupling 64a or another vehicle with a suitable hitch or coupling arrangement. The king pin is located at the bottom of the front end, and in the embodiment shown, is secured to and extending down from the central lower member under the walkway of lengthwise frame member 32g (FIG. 11).

A trailer-axle suspension system 50 and wheels 52 are secured to the frame 32 at the back of the frac tank 12. The suspension system and wheels are located in the lower open space 40 within the width and length boundaries of the upper tank section 30. The suspension system and wheels are configured for over-the-road or highway speed travel, to enable the frac tank to be transported with the semi-tractor 64 or other vehicle. The back of the frac tank shown includes a horizontal step bar 54 (see FIGS. 7, 10) located behind the wheels such as for personnel access to fill-valve locations 56. The step bar is supported by a pair of vertical bars 58 extending downwardly from the lower back horizontal cross beam 38c. An optional step ladder (not shown) may be provided for connection to the back of the tank such as for personnel access to the top of the tank. A drain valve location 70 is provided at the back of the tank, at the longitudinal center and lowest position in the tank bottom.

Front and back frames 80, 90 are removably connected at the front and back of the frac tank system 10. When in position on the tank 12, the frames "square-off" the front and back ends of the frac tank to establish the containerized condition and enable stacking with additional frac tank systems as well as conventional shipping containers 60.

The front frame 80 is preferably a self-contained or self-supporting, generally rectangular rigid frame that is normally removed from the tank 12 during use supplying fluid at the drilling site, is connected to the tank for containerized transport purposes, and may be connected to the tank for storage purposes. When in position on the tank, the front frame extends forwardly from the front 20 of the tank and surrounds the valve manifold 44, the stairs 42 and other components at the front end of the tank. Thus, the front frame in place provides protection of components at the front end of the tank during containerized transport and storage.

In the embodiment shown, the front frame 80 includes two vertical load-bearing supports, posts, columns or the like, herein referred to as uprights 82 establishing the two front corners of the frame. These uprights establish the front corners of the frac tank system in the containerized condition. A front support beam 84 is secured (e.g., bolted or welded) between the top portions of the uprights 82. Additional front supports 84a bearing may be secured between the two corner uprights 82 as desired for structural integrity. Side support beams 86 are secured to and extend rearwardly from the top portions of the corner uprights 82 Additional side supports 86a may extend rearwardly from the two corner uprights 82. The lower ends of the corner uprights 82 extend into the corner spaces 32e of the lower frame 32. The front frame is removably connected to the front of the tank with bolts 66 through flanges 88a welded on the free ends of the side supports 86, 86a and the front upright corner beams 36 of the tank, and with bolts 66 through flanges 88b at the bottom of the front frame 32a and the lower ends of the front frame uprights 82 (see e.g., FIGS. 15-16).

The back frame 90 is also a generally rectangular rigid frame, preferably self-contained or self-supporting, that is normally removed from the tank 12 during use supplying fluid at the drilling site, is removed from the tank during mobile transport purposes (e.g., pulled by a truck), is connected to the tank for containerized transport purposes (e.g., by train or ship) and may be connected to the tank for storage purposes. When in position on the tank, the back frame extends downwardly from the back 22a and sides of the upper tank section 30 to surround the axle-suspension system 50 and wheels 52 and other components that may be located in the space 40 below the upper tank section 30. Thus, the back frame in place provides protection of components at the back end of the tank during containerized transport and storage. When in position on the tank, the back frame also establishes support under the upper tank section 30 to enable stacking of the frac tank system with other frac tank systems and conventional containers.

In the embodiment shown, the back frame 90 includes two uprights 92 establishing the two back corners of the frame. These uprights are aligned under the vertical corner beams 38a of the upper tank section 30, which together establish the back corner structure of the frac tank system in the containerized condition. A back support beam 94 is secured between the lower portions of the uprights 92. Additional back supports may secured between the two back uprights 92 as desired for structural integrity. Side supports 96 are secured to and extend forwardly from the lower portions of the corner uprights 92. The back frame is removably connected to the lower back section 30 of the tank with bolts 66 through flanges 98b secured on the free ends of the side supports 96, and with bolts 66 through flanges 98a secured to the upper ends of the uprights 92 at the frame member along the bottom of the upper tank section 30 (see e.g., FIGS. 20-21).

Crane pockets, also known as lift pockets and corner fittings 110 are welded (or otherwise secured) to the top and bottom, and front and back corners of the frac tank system 10. The corner fittings 110 are provided with openings 112 to enable engaging or gripping and lifting of the frac tank system with cranes and similar container-moving equipment such as of the type commonly used at shipping ports. In the embodiment shown, corner fittings 110 are secured to the top and bottom front corners of the front frame 80 (at the top of the front uprights 82 connecting the cross-beam 84 and top side beam 86 thereto, and at the bottom of the front uprights 82), the top back corners of the upper tank section 30 (at the top of back uprights 38a), and the bottom back corners of the back frame 90 (at the bottom of the back uprights 92 connecting the lower cross beam 94 and lower side beams 96 thereto). Preferred corner fittings 110 are configured per the applicable ISO standard for freight containers, are aligned along the top and bottom (nominally horizontal as shown in FIG. 1), and the front and back (nominally vertical such as shown in FIG. 1) of the frac tank, and include forwardly or rearwardly, left or right, and upwardly or downwardly, as applicable, outwardly facing openings 112 at each corner for engagement by the lifting and moving equipment.

In the preferred embodiment shown, crane pockets 110a with openings 112 are also secured to the front upper corners of the tank 12, at the top of the tank front uprights 36. This provides for the four upper corners of the frac tank having permanently welded corner fittings so that the frac tank can be picked up by a crane and moved even with the front frame 80 removed from the tank.

Additionally, in the preferred embodiment shown, three more pairs of crane pockets 110a with openings 112 are further provided to establish top and bottom, and front and back lift locations, rearwardly of the front corner fittings 110 and forwardly of the rear corner fittings 110. In this instance, crane pockets 110a are secured on each side of the tank to the top of uprights 38e, to the bottom of uprights 92a, and under lower frame support 32b aligned under uprights 36. The uprights 38e are located in the sides of the upper tank section 30, forwardly of the rear corners of the tank, and extending from the crane pockets 110a to the lower side tank supports 38d. The uprights 92a are part of the back frame 90, aligned under the uprights 38e, connected between the lower side tank supports 38d (via flanges 98a) and the side supports 96 of the back frame. In this instance, the side supports 96 include forward and rear side support segments connected by the crane pockets at the bottom of the uprights 92a. The pair of crane pockets 110a aligned under uprights 36 may be removably secured under lower frame support 32b such as if convenient to avoid interference with the fifth wheel coupling 64a of the semi-tractor 64 when in transit. There may be cross-beams (not shown), similar to cross-beam 94, connecting the crane pockets at the lower ends of uprights 92a, and the crane pockets aligned under uprights 36. With this arrangement, the distance between the front and back corner fittings 110 can be established for correspondence with one standard size ISO intermodal container (such as 45-foot containers), and the distance between the front and back crane pockets 110a can be established for correspondence with another standard size container (such as 40-foot containers). As shown in FIGS. 5-6, this enables interchangeable stacking of frac tank systems 10, containers 60A of a first length, and containers 60B of a second length. Thus, when stacking, the corner pockets of the longer containers 60A will align with corner fittings 110 of the frac tank system, and the corner pockets of the shorter containers 60A will align with crane pockets 110a of the frac tank system. It should be noted that, the corner fittings 110 and crane pockets 110a may be configured identically, but as used herein, the terms corner fittings and crane pockets distinguish between lift pockets at the corners of the frac tank system (the corner fittings 110) and lift pockets not in the corners of the frac tank system (the crane pockets 110a).

Figure 24:
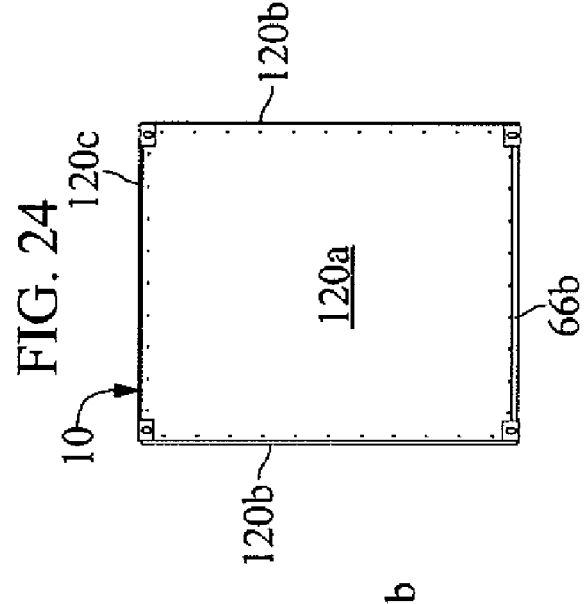
FIGS. 23-25 are views similar to FIGS. 1-3, but showing frame covers in place on the front and back frame adapters of the frac tank system.
Figure 25:
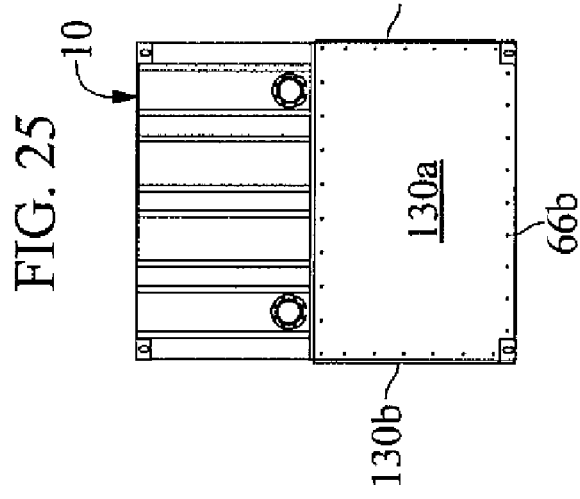
Figure 23:
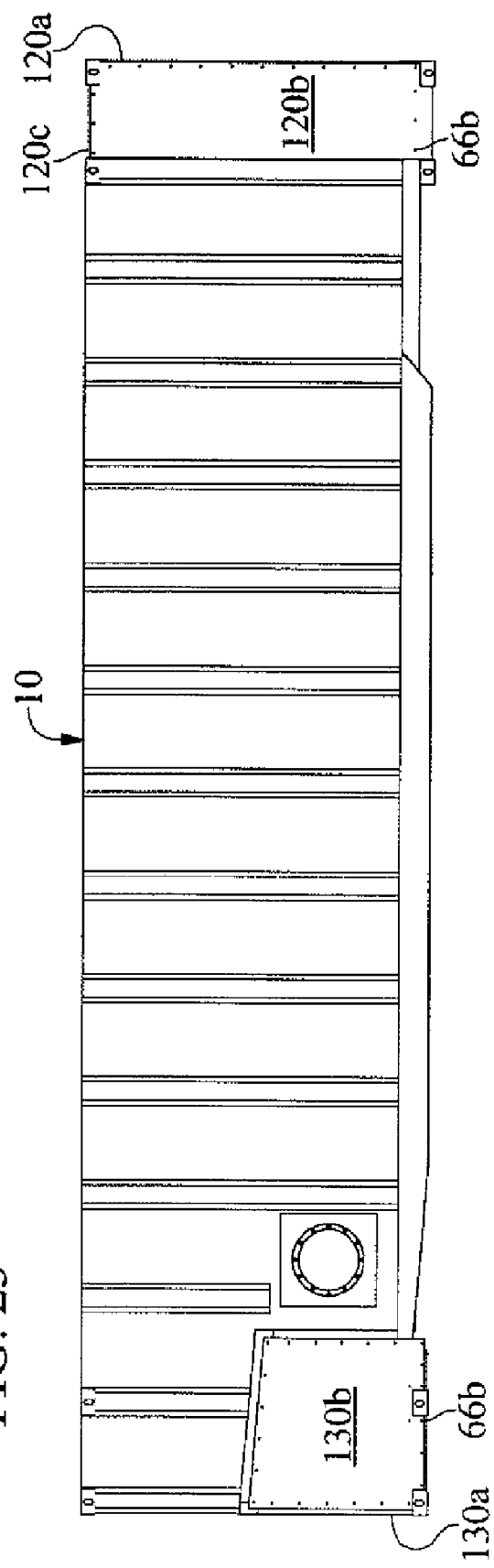

Front and rear cover panels 120a-c, 130a-b (see FIGS. 23-25) may be removably secured to the front and rear frames 80, 90 such as with threaded fasteners 66b, to cover large openings in the frames (e.g., at the front, top and sides of the front frame, and the back and sides of the rear frame) and surround the components at the front and back of the frac tank system. The cover panels thus provide further protection of the components at the ends of the frac tank system 10 during transport and storage, but do not restrict access to the corner fittings 110 by container moving equipment or for frac tank system and container stacking purposes.

With the foregoing arrangement, the frac tank system 10 can be converted from a containerized condition, with the front and rear frames 80, 90 secured to the frac tank 12, to enable stacking with other frac tank systems as well a conventional shipping containers for storage or shipping by rail or ship, and a mobile condition, with at least the rear frame 90 removed, exposing the wheels 52 to support the back end of the frac tank, for transport with a conventional truck using the king pin 48. The frac tank system achieves additional advantages, as described above.

In view of the disclosure hereof, those skilled in the are will devise alternate arrangements that fall within the scope of the invention, including providing a frac tank system having a containerized condition for handling and shipping as a conventional container, but that is also provided with wheels that can be exposed for pulling with a fifth-wheel equipped vehicle. Those skilled in the are will also devise alternate arrangements that fall within the scope of the invention for providing a frac tank system that includes a mobile frac tank configured for pulling with a fifth-wheel or other coupling equipped vehicle, and adapter frames for converting the mobile frac tank into a containerized frac tank.

The invention claimed is:

1. A frac tank system comprising:
   a) a mobile frac tank comprising
      i) a tank for holding fluid, the tank having a front end, a rear end, a bottom and opposite sides, the rear end of the tank being raised above an open space,
      ii) fluid connection means for transferring fluid into and out of the tank,
      iii) a frame supporting the tank, the frame extending to the back of the tank, the frame having a lower frame section extending forwardly from the front of the tank, wherein the outer boundaries of the frame and tank cooperatively establish a first rectangular space defined therein,
      iv) a fifth-wheel king pin carried on said lower frame section,
      v) a trailer-axle and wheels connected to the frame, the trailer-axle and wheels being contained entirely in said open space, under and within the length and width of the rear end of the tank, for rolling support of the back of the tank,
      vi) whereby the mobile tank may be releasably connected to and pulled by a fifth-wheel coupling equipped vehicle, and
      vii) a pair of corner fittings connected at the top front corners of the tank, and a pair of corner fittings connected at the top rear corners of the tank, the corner fittings being configured for lifting the tank with a container-lifting device,
   b) a front adapter removably connectable at the front of the tank, the front adapter being configured to surround a space above said lower frame section, the front adapter having front uprights on each side of the tank and corner fittings at the top and bottom of said front uprights at the upper and lower front corners of said rectangular space, and
   c) a rear adapter removably connectable at the back of the tank in said open space, the rear adapter being configured to surround the trailer-axle and wheels, the rear adapter having uprights on each side of the tank and corner fittings at the bottom of said rear uprights at the lower back corners of said rectangular space,
   d) the front and rear adapters being configured to "square-off" the ends of the mobile frac tank to a conventional intermodal shipping container size, the front and rear adapters establishing a generally rectangular support structure, whereby frac tank systems can be stacked on one another and interchangeably with conventional intermodal shipping containers with the corner fittings thereof aligned with one another.

2. The frac tank system as defined in claim 1 in which said adapters include enclosing removable cover panels.

3. The frac tank system as defined in claim 1 in which the tank has a generally rectangular cross-section substantially filling said rectangular space.

4. The frac tank system as defined in claim 1 further comprising (i) a pair of lower forward crane pockets aligned under said corner fittings at the top front corners of the tank, (ii) a pair of upper rear crane pockets aligned forwardly of the corner fittings at the top back corners of the tank, and a pair of lower rear crane pockets aligned under the upper rear crane pockets, wherein said crane pockets and said corner fittings at the top front corners of the tank establish a second rectangular space that is shorter and contained within said first rectangular space, and frac tank systems can be stacked on one another and interchangeably with conventional intermodal shipping containers of two different lengths, with the corner fittings and crane pockets thereof aligned with one another.

5. A frac tank system comprising:
a) a tank for holding fluid, the tank having a front end, a rear end, a bottom and enclosing sides, the rear end of the tank being raised above an open space,
b) fluid connection means for transferring fluid into and out of the tank,
c) a frame carrying the tank, the frame being configured for stacking tanks onto one another, and for stacking tanks interchangeably with intermodal shipping containers,
  i) the frame having front and rear vertical load-bearing supports for supporting the weight of tanks and containers stacked thereabove,
  ii) the rear vertical load-bearing support including (a) upper vertical load-bearing support and (b) lower vertical load-bearing support in said open space, said lower support being removable when not required to assist in supporting the weight of tanks or containers stacked thereabove,
d) front and rear lift pockets at the top of the frame on each side of the tank, the lift pockets being configured to enable gripping and lifting of the tank with container-lifting means,
e) means for releasably coupling the front of the tank to a wheeled vehicle, and
f) wheel means in said open space for rolling support of the back of the tank when said lower support is removed, whereby the tank becomes mobile and may be pulled with said vehicle with said lower support removed.

6. The frac tank system as defined in claim 5 wherein the front and rear vertical load-bearing supports comprise front and rear uprights on each side of the tank to assist in supporting the weight of tanks or containers stacked thereabove, and wherein each rear upright includes (i) an upper upright at the rear end of the tank and (ii) a lower upright aligned under said upper upright in said open space, the lower uprights being removable when not required to assist in supporting the weight of tanks or containers stacked thereabove.

7. The frac tank system as defined in claim 6 in which the front and rear lift pockets are located at the top of the front and rear uprights, respectively, wherein the lift pockets are in the load-bearing path at the top of the uprights.

8. The frac tank system as defined in claim 7 further comprising front and rear lower lift pockets located at the bottom of the front and rear uprights, respectively, wherein the lower lift pockets are in the load-bearing path at the bottom of the uprights.

9. The frac tank system as defined in claim 7 in which the tank has a three-dimensional generally rectangular outer profile.

10. The frac tank system as defined in claim 7 in which tank and all parts of the frac tank system are contained within a three-dimensional rectangular outer profile established by the frame and lifting pockets.

11. The frac tank system as defined in claim 5 wherein said lower vertical load-bearing support is embodied in a removable rear adapter with rear lower uprights on each side of the tank at the back of said open space, lateral support between the rear lower uprights, and side supports connecting the rear lower uprights to the frame at the front of said open space.

12. The frac tank system as defined in claim 11 in which said rear adapter includes enclosing removable cover panels.

13. The frac tank system as defined in claim 5 in which the frame includes a front lower section extending forwardly from the front end of the tank, the frac tank system includes elements associated with the front lower frame section, and the front vertical load-bearing support is removable for improved access to said the front lower frame section and the elements associate therewith.

14. The frac tank system as defined in claim 13 wherein said front vertical load-bearing support is embodied in a removable front adapter with front uprights on each side of the front lower frame section, lateral support between the front uprights, side supports connecting the front uprights the front of the tank, and lift pockets at both the top corners of the tank and on the front uprights at the top corners of the front adapter.

15. A frac tank system as defined in claim 14 in which said front adapter includes enclosing removable cover panels.

16. A frac tank system comprising:
a) a mobile frac tank comprising
  i) a tank for receiving, holding and providing fluid, the tank having a front end, a rear end, a top, a bottom and opposite sides,
  ii) means for releasably coupling the front of the tank to a vehicle,
  iii) rear suspension and wheels for rolling support of the back of the tank, and
  iv) a pair of front corner fittings on each side of the tank, and a pair of rear corner fittings on each side of the tank, the corner fittings being configured for lifting the tank with a container-lifting device, and
b) a front adapter removably connectable at the front of the tank, the front adapter having top and bottom corner fittings on each side of the tank, and
c) a rear adapter removably connectable around the rear suspension and wheels, the rear adapter having bottom corner fittings on each side of the tank,
d) the front and rear adapters being configured to "square-off" the ends of the mobile frac tank to a conventional intermodal shipping container size, the front and rear adapters establishing a first support structure whereby frac tank systems can be stacked on one another and interchangeably with conventional intermodal shipping containers with the corner fittings thereof aligned with one another.

17. The frac tank system as defined in claim 16 further comprising additional corner fittings establishing a second support structure whereby frac tank systems can be stacked on one another and interchangeably with conventional intermodal shipping containers of two different lengths with the corner fittings thereof aligned with one another.

* * * * *